United States Patent
Tsuji et al.

(10) Patent No.: US 7,435,511 B2
(45) Date of Patent: Oct. 14, 2008

(54) NICKEL-METAL HYDRIDE STORAGE BATTERY

(75) Inventors: Yoichiro Tsuji, Katano (JP); Haruya Nakai, Fujisawa (JP); Yoshiyuki Muraoka, Kamakura (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 525 days.

(21) Appl. No.: 10/420,894

(22) Filed: Apr. 23, 2003

(65) Prior Publication Data

US 2003/0203283 A1    Oct. 30, 2003

(30) Foreign Application Priority Data

Apr. 25, 2002 (JP) .............................. 2002-124148

(51) Int. Cl.
*H01M 2/16*    (2006.01)
*H01M 10/30*    (2006.01)

(52) U.S. Cl. ...................... 429/254; 429/94; 429/218.2

(58) Field of Classification Search ....................... None
See application file for complete search history.

(56) References Cited

U.S. PATENT DOCUMENTS 6,328,769 B1 * 12/2001 Oweis et al. ............... 29/623.1
6,994,935 B2 * 2/2006 Matsumoto .................. 429/250
7,087,345 B2 * 8/2006 Matsumoto ................... 429/94

FOREIGN PATENT DOCUMENTS

| JP | 11-86898 | | 3/1999 |
|----|----------|---|--------|
| JP | 11-135114 | * | 5/1999 |
| JP | 2000-48823 | | 2/2000 |
| JP | 2001-283895 | | 10/2001 |
| JP | 2002-063889 | | 2/2002 |

* cited by examiner

*Primary Examiner*—John S Maples
(74) *Attorney, Agent, or Firm*—McDermott Will & Emery LLP

(57) ABSTRACT

A nickel-metal hydride storage battery having a spirally wound electrode group including: (a) a positive electrode including an active material layer containing nickel hydroxide and a positive electrode core material; (b) a negative electrode including an active material layer containing a hydrogen storage alloy and a negative electrode core material; and (c) a separator interposed between the positive and negative electrodes, wherein the separator includes a hydrophilicity-imparted non-woven fabric including polyolefin or polyamide and has a thickness of 0.04 to 0.09 mm, and the percentage occupied by the cross section "$S_S$" of the separator in the transverse cross section "S" of the electrode group is not greater than 25%.

4 Claims, 3 Drawing Sheets

NICKEL-METAL HYDRIDE STORAGE BATTERY

BACKGROUND OF THE INVENTION

A nickel-metal hydride storage battery includes, as electric power generation elements, a positive electrode mainly composed of nickel hydroxide, a negative electrode mainly composed of a hydrogen storage alloy, a separator interposed between the positive and negative electrodes, and an electrolyte of an aqueous alkaline solution in which potassium hydroxide is dissolved. These electric power generation elements are typically housed in a battery case made of metal or plastic, which is then hermetically sealed. A nickel-metal hydride storage battery is provided with a safety valve which operates in the event of abnormal increase in internal pressure of the battery. A nickel-metal hydride storage battery usually has a shape analogous to a cylinder or prism.

A nickel-metal hydride storage battery has been in practical use since about ten years ago, and its demand is greatly increasing now. A nickel-metal hydride storage battery can be used in a wide variety of application such as power sources for portable devices primarily, power sources for mobile units including electric vehicles and bikes, backup power sources for telecommunications and power sources for electric tools. A nickel-metal hydride storage battery has a high energy density and excellent output characteristics and is relatively low cost. It is expected, in the future, to be used in high power applications for electric vehicles, electric tools, etc.

The positive electrode of a nickel-metal hydride storage battery is mostly a paste type (non-sintered type) electrode comprising a spongy, nickel core material and a paste filled into the core material. The paste is mainly composed of nickel hydroxide. A sintered-type positive electrode comprising a porous core material, which is prepared by sintering powdered nickel, and nickel hydroxide produced in the pores of the porous core material is also known. These positive electrodes normally have a thickness of about 0.6 to 0.8 mm.

The negative electrode of a nickel-metal hydride storage battery is mostly a paste type electrode comprising a core material such as punched metal sheet and a paste carried on the core material. The paste contains powdered hydrogen storage alloy, conductive agent, binder, etc. As the hydrogen storage alloy, an $MmNi_5$ (Mm is a mixture of rare-earth elements) based alloy in which Ni is partly substituted by other metal elements such as Co, Mn or Al is used. The negative electrode typically has a thickness of about 0.4 to 0.6 mm.

As the separator, a hydrophilicity imparted non-woven fabric comprising polyolefin such as polyethylene or polypropylene is used. The separator conventionally has a thickness of about 0.1 to 0.2 mm.

As the electrolyte, a highly concentrated aqueous alkaline solution with a pH of not less than 14, which dissolves KOH as main component and is added with NaOH, LiOH, etc, is used.

The positive and negative electrodes and the separator interposed therebetween are stacked or spirally wound to form an electrode group. The electrode group is housed in a battery case, the electrolyte is added thereinto, and the opening of the battery case is sealed to give a hermetically sealed nickel-metal hydride storage battery.

In the field of nickel-metal hydride storage battery, the improvements in battery performance are required every year by the market. For example, the battery energy density, which is an important characteristic, has nearly doubled in the last ten years. In order to realize such high energy density, an attempt has been made to reduce the length of the positive and negative electrodes and increase the thickness of the positive and negative electrodes. The reason for this attempt is in the fact that long electrodes require a long separator. When a separator is long, the volume occupied by the separator in the battery volume is increased; therefore, the energy density is not improved.

In recent years, along with the improved energy density of a nickel-metal hydride storage battery, there has been an increasing demand for a battery with high output characteristics in the market. Because a nickel-metal hydride storage battery uses an aqueous electrolyte, it has excellent ion conductivity, as compared to a non-aqueous electrolyte battery, and is suitable for high power applications which require a large current discharge.

Since a conventional nickel-metal hydride storage battery is developed mainly for the purpose of enhancing its energy density, there is much to be improved in terms of high output characteristics. The future challenge is to develop a nickel-metal hydride storage battery having both high capacity and high output characteristics which are technically incompatible with each other.

In order to achieve the high output characteristics of a nickel-metal hydride storage battery, it is effective to form long and thin electrodes. It is impossible, however, to achieve its high energy density only by forming long and thin electrodes because the volume percentage occupied by the separator in the battery volume is increased.

In order to realize a nickel-metal hydride storage battery of a great power with a high capacity, it is effective to use a thin separator. However, a thin separator is likely to cause internal short circuits; therefore, the battery reliability is impaired. A conventional separator usually uses a non-woven fabric comprising polyolefin and has a thickness of 0.1 to 0.2 mm. When the thickness is reduced to 0.1 mm or thinner, the incidence of internal short circuit is increased. Accordingly, there is a desire for a thin separator with high reliability.

In order to reduce the thickness of electrodes of a nickel-metal hydride storage battery, Japanese Laid-Open Patent Publication No. 2000-48823 proposes a technique to use a thin metal plate having a micro-rough surface as electrode core material, and Japanese Patent Publication No. 3191752 proposes a technique to use a positive electrode in the form of thin film. In order to enhance the output characteristics of the battery, Japanese Laid-Open Patent Publication No. Hei 11-86898 proposes to form a long negative electrode with a capacity per unit area of 10 to 40 $mAh/cm^2$.

BRIEF SUMMARY OF THE INVENTION

It is an object of the present invention to provide a nickel-metal hydride storage battery with both high capacity and high output characteristics by a new technique.

The nickel-metal hydride storage battery of the present invention has a spirally wound electrode group. The electrode group comprises: (a) a positive electrode comprising an active material layer containing nickel hydroxide and a positive electrode core material; (b) a negative electrode comprising an active material layer containing a hydrogen storage alloy and a negative electrode core material; and (c) a separator. The positive and negative electrodes are spirally wound with the separator interposed therebetween. The separator comprises a hydrophilicity-imparted non-woven fabric, and the non-woven fabric is made of polyolefin or polyamide. The separator has a thickness of 0.04 to 0.09 mm. The percentage occupied by the cross section "$S_s$" of the separator in the transverse cross section "S" of the electrode group is not greater than 25%. The separator preferably has an apparent density of 0.3 to 0.4 g/cm$^3$.

It is preferred that the positive electrode has a thickness of 0.1 to 0.5 mm and the negative electrode has a thickness of 0.1 to 0.3 mm. The total thickness of the three layers of the positive electrode, the separator and the negative electrode is preferably 0.24 to 0.89 mm. The percentage occupied by the cross section "$S_p$" of the positive electrode in the transverse cross section "S" of the electrode group is preferably not less than 40%.

The present invention further relates to a nickel-metal hydride storage battery having a battery case for containing the electrode group. It is preferred that the length of the positive electrode is not less than 5 times and not more than 10 times the inner perimeter "L" in the transverse cross section of the battery case.

The positive electrode core material preferably comprises a metal foil with a thickness of not greater than 0.03 mm, and the metal foil may be flat or deformed to have a three-dimensional structure. It is preferred that the positive electrode core material is not exposed at the surface, on which the active material layer containing nickel hydroxide and the separator face with each other, of the positive electrode.

It is preferred that each of the positive and negative electrode core materials has a thicker lengthwise end than the other portion thereof, which is for example formed of a longitudinal area at one end of the electrode core material. The thicker ends of the positive and negative electrode core materials are respectively exposed at one end of the electrode group and at the other end thereof to serve as spiral positive and negative electrode leads. The use of the spiral lead like this can collect electric current from the whole current collector plate.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
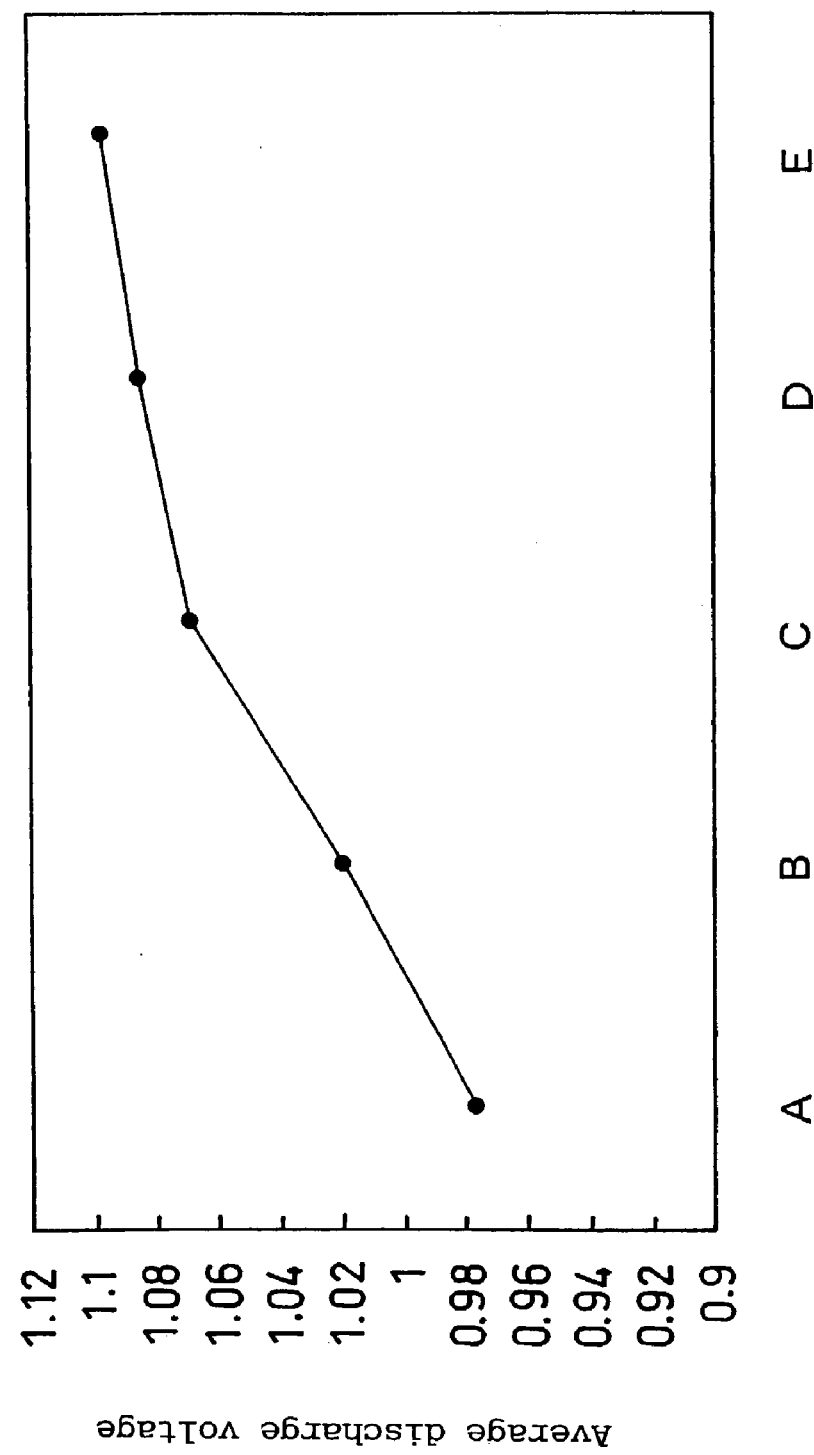
FIG. 1 is a graph showing the average discharge voltage at high rate discharge (when discharged at 30 A) of each of the batteries in accordance with EXAMPLE 1.

The present invention relates to a nickel-metal hydride storage battery having a spirally wound electrode group, and the electrode group comprises: (a) a positive electrode comprising an active material layer containing nickel hydroxide and a positive electrode core material; (b) a negative electrode comprising an active material layer containing a hydrogen storage alloy and a negative electrode core material; and (c) a separator. The positive and negative electrodes are spirally wound with the separator interposed therebetween. The separator comprises a hydrophilicity-imparted non-woven fabric, and the non-woven fabric is made of polyolefin or polyamide. The separator has a thickness of 0.04 to 0.09 mm. When the thickness of separator is less than 0.04 mm, it is difficult to prevent short circuits; on the contrary, when the thickness exceeds 0.09 mm, a nickel-metal hydride storage battery having both high capacity and high output characteristics cannot be obtained.

A conventional nickel-metal hydride storage battery uses, for instance, a separator comprising a hydrophilicity-imparted non-woven fabric made of polyolefin or polyamide with a thickness of not less than 0.12 mm and weight per unit area of the separator plane of not less that 60 g/m$^2$. Accordingly, a nickel-metal hydride storage battery with such a thin separator as described previously is not known. The following are the reasons.

The fiber for a conventional separator has a relatively large diameter. Hence, when a separator with a thickness of not greater than 0.09 mm is produced using the fiber, it has micropores with a maximum diameter of 35 μm or larger, leading to a high incidence of internal short circuit. However, when an ultra-thin fiber is used without discretion when producing a separator in order to make the maximum diameter of micropores small, the permeability of gases generated within the battery is diminished. When the weight per unit area of the separator plane is reduced in order to enhance the gas permeability, the strength of the separator is lowered and the separator may be damaged during the formation of the electrode group. In order to prevent the damage, the separator is required to have a tensile strength of not less than 50 N/5 cm.

The separator, which has a small thickness of 0.04 to 0.09 mm but ensures high performance, can be obtained, for instance, by providing it with an apparent density (density of the separator including pores) of 0.3 to 0.4 g/cm$^3$. When the apparent density is within the above range, it is possible to obtain a separator with a mean pore diameter of 20 μm or smaller and a gas permeability of not less than 10 cm/s which is a necessary value. It is also possible to increase the pure water retention rate to 150% or higher. When the apparent density of the separator is less than 0.3 g/cm$^3$, the separator cannot have a mean pore diameter of 20 μm or less, which makes it difficult to prevent internal short circuits. When the apparent density of the separator exceeds 0.4 g/cm$^3$, the gas permeability of the separator decreases and the battery internal pressure is likely to increase. Incidentally, conventional separators usually have an apparent density of about 0.5 g/cm$^3$.

Preferably, the separator has a weight per unit area of the separator plane of 25 to 40 g/m$^2$. When the weight per unit area of the separator plane is less than 25 g/m$^2$, the strength of the separator is lowered and the separator is likely to be damaged during the formation of the electrode group. When the weight per unit area of the separator plane is over 40 g/m$^2$, the apparent density of the separator exceeds 0.4 g/cm$^3$ and the gas permeability of the separator decreases.

The physical properties of the separator are evaluated as follows.

(i) The tensile strength and the gas permeability are evaluated according to JIS-L1096: 1999 (general textile test method).

(ii) The pure water retention rate is determined by substituting W1 and W2 for the equation:

$$\text{Pure water retention rate (\%)} = \{(W2-W1)/W1\} \times 100,$$

where W1 is a weight of a piece of the separator, and W2 is a weight of the piece of the separator measured 10 minutes after the separator piece is immersed in pure water for 1 hour and lifted therefrom.

A conventional separator has a thickness of not less than 0.1 mm at the thinnest, but it is essential that the separator should have a thickness of 0.04 to 0.09 mm in order for a nickel-metal hydrogen storage battery to have a high capacity. The use of such a thin separator can reduce the percentage occupied by the cross section "$S_S$" of the separator in the transverse cross section "S" of the electrode group (the cross section parallel to the end surface (bottom surface) of the electrode group) to 25% or less. This means that longer electrodes can be produced without an increase in the percentage occupied by the separator in the electrode group. Long electrodes are extremely advantageous to achieve both high capacity and high output characteristics. In the transverse cross section "$S_c$" of an electrode group with a conventional separator, the percentage occupied by the cross section "$S_{cs}$" of a conventional separator is usually not less than 30%.

From the viewpoint of achieving both high capacity and high output characteristics, the percentage occupied by the cross section "$S_p$" of the positive electrode in the transverse cross section "S" of the electrode group is preferably not less than 40% and not greater than 60%. This is because, when the percentage occupied by the cross section "$S_p$" of the positive electrode exceeds 60%, the capacity ratio of the positive electrode to the negative electrode becomes excessively large and the battery performance tends to be degraded. In order to satisfy these requirements, the positive electrode preferably has a thickness of 0.1 to 0.5 mm, more preferably 0.1 to 0.4 mm. A conventional paste or sintered type positive electrode typically has a thickness of 0.6 to 0.8 mm.

A conventional negative electrode typically has a thickness of 0.4 to 0.6 mm; however, the negative electrode of the present invention preferably has a thickness of 0.1 to 0.3 mm. When the negative electrode has a thickness of less than 0.1 mm, the whole capacity of the negative electrode tends to be deficient, whereas when the thickness of the negative electrode exceeds 0.3 mm, the effect of achieving both high capacity and high output characteristics is reduced.

The total thickness of the three layers of the positive electrode, the separator and the negative electrode is preferably 0.24 to 0.89 mm. This is because, when the total thickness is less than 0.24 mm, it is difficult to realize high energy density of the battery; at the same time, the reliability tends to decrease. Meanwhile, when the total thickness exceeds 0.89 mm, the battery does not produce enough high output power. The total thickness of the three layers of a conventional positive electrode, separator and negative electrode is usually 1.1 to 1.6 mm because a conventional separator has a thickness of 0.1 to 0.2 mm.

Since the nickel-metal hydride storage battery of the present invention uses a thinner separator than a conventional one, the energy density of the battery does not decrease even if the thickness of the positive and negative electrodes is reduced; therefore, the improvement in output characteristics can be maximized by using thinner electrodes.

It is extremely effective, from the viewpoint of achieving high output characteristics, that the positive electrode has a length of 5 L or more when the length of the inner perimeter in the transverse cross section of the battery case for containing the electrode group is denoted as "L". The length of 5 L is unprecedentedly long. The use of such long and thin electrode can produce a battery with remarkably high output characteristics. When the positive electrode has a length of 10 L or more, however, the battery capacity tends to be small; accordingly, the length of 10 L or less is preferred. It is to be noted that the length "L" can be the length of the perimeter of the transverse cross section of the electrode group because the inner face of the battery case is usually in contact with the side face of the electrode group.

The positive electrode core material is preferably made of metal foil with a thickness of 0.03 mm or prepared by processing the metal foil to have a three-dimensional structure. An example of the core material having a three-dimensional structure includes, but is not limited to, an embossed core material.

It is preferred that the positive electrode core material is not exposed at the surface, on which the positive electrode active material layer and the separator face with each other, of the positive electrode. This is because, when the separator with a thickness of 0.08 mm or less is used, there is a possibility that the core material penetrates the separator to cause internal short circuits due to the unprecedented thinness of the separator. It is also preferred that the both surfaces of the positive electrode core material are completely covered with the active material layer, except for one end portion which is used for current collection.

It is preferred that each of the positive and negative electrode core materials has a thicker lengthwise end than the other portion thereof. The thicker lengthwise end may be formed of the longitudinal area at one end of the electrode core material. The thickly formed ends of the positive and negative electrode core materials are respectively exposed at one end of the electrode group and at the other end thereof so that they respectively serve as spiral positive electrode lead and spiral negative electrode lead. Each spiral lead located at either end of the electrode group is connected to a current collector plate, which makes it possible to collect electric current effectively; therefore, the output characteristics are further improved.

The thicker end of the core material described above can be formed by folding the end portion, on which the active material layer is not carried and the core material is exposed, of the core material. Alternatively, the thicker end can be formed by applying powdered nickel onto the end portion, on which the active material layer is not carried, of the core material, followed by sintering. The core materials with the thicker end which constitute electrodes are wound with the separator so that the thicker end of the core materials is also spirally wound, and the spirally wound end is connected to the current collector plate by welding. This structure can ensure weld strength even when a very thin core material with a thickness of not greater than 0.03 mm is used. Additionally, resistance polarization characteristics can be greatly improved when charge/discharge at a large current.

The following specifically describes the present invention based on examples, but the present invention should never be limited to the following examples.

EXAMPLE 1

This example produced a cylindrical sealed type nickel-metal hydride storage battery of SC size (outer diameter: 23 mmΦ, length: 43 mm). Batteries were produced by changing the size of the electrodes and separator; subsequently, the relationship between the battery characteristics and the ratio of the length ($L_p$) of the positive electrode to the length "L" of the inner perimeter in the transverse cross section of the battery case (hereinafter referred to as "$L_p/L$ ratio") was examined. All of the following points were met when producing each of the batteries in this example.

(a) The battery capacity was to be 3 Ah.

(b) The percentage occupied by the cross section of the positive electrode in the transverse cross section of the electrode group was to be 45%.

(c) The percentage occupied by the cross section of the negative electrode in the transverse cross section of the electrode group was to be 32%.

(d) The percentage occupied by the cross section of the separator in the transverse cross section of the electrode group was to be 23%.

The positive and negative electrodes and the separator were to have the sizes (width: X mm×length: Y mm×thickness: Z mm) shown in Table 1.

TABLE 1

| Battery | Lp/L | Size of positive electrode (mm) | Size of separator (mm) | Size of negative electrode (mm) |
|---|---|---|---|---|
| A | 3.85 | 35 × 260 × 0.533 | 36 × 655 × 0.120 | 35 × 308 × 0.310 |
| B | 4.74 | 35 × 320 × 0.452 | 36 × 770 × 0.118 | 35 × 370 × 0.268 |
| C | 5.78 | 35 × 390 × 0.360 | 36 × 915 × 0.080 | 35 × 440 × 0.228 |
| D | 7.71 | 35 × 520 × 0.273 | 36 × 1175 × 0.060 | 35 × 570 × 0.185 |
| E | 9.63 | 35 × 650 × 0.234 | 36 × 1450 × 0.041 | 35 × 700 × 0.172 |

The batteries C to E represent embodiments of the present invention and the batteries A and B represent comparative examples. The battery A is a commercially available battery having a relatively large electrode surface area. The battery B is a battery between the battery A and the batteries C to E.

The following explains the method for producing the batteries shown in Table 1.

(i) Production of Positive Electrode

As the positive electrode active material was prepared conventional nickel hydroxide spherical powders carrying cobalt oxyhydroxide on the surface thereof. The amount of cobalt oxyhydroxide was 10 parts by weight per 100 parts by weight of nickel hydroxide. The powders were mixed with water to give a positive electrode paste.

As the positive electrode core material was formed an embossed core material having a micro-rough surface. The embossed core material was prepared by providing the surface of a nickel foil having a thickness of 0.02 mm with projections and depressions at a pitch of 0.5 mm, and the apparent thickness of the embossed core material was set to 0.5 mm. The longitudinal area at one end of the embossed core material was not provided with projections and depressions; accordingly, the area was plain and had a height of 3 mm.

The positive electrode paste was applied onto the both surfaces of the embossed core material, which was then dried and pressed to form a positive electrode active material layer. This gave a positive electrode comprising the embossed core material and the positive electrode active material layers carried on the embossed core material. The thickness of the positive electrode was adjusted when pressing the paste-applied core material.

The positive electrode had a width of 35 mm. The positive electrode active material layer was not carried on the plain longitudinal area, which had a height of 3 mm and a thickness of 0.02 mm, of the positive electrode core material. The plain area was double folded to form an end with a height of 1 mm and a thickness of 0.06 mm. It was made sure that the positive electrode core material is not exposed at the surface, on which the positive electrode active material layer is carried, of the positive electrode.

(ii) Production of Negative Electrode

As the negative electrode active material was prepared conventional nickel-based $AB_5$ hydrogen storage alloy powders containing rare-earth elements. The hydrogen storage alloy was synthesized by a conventional melting method, which was then heated at 1000° C. in an inert atmosphere for 1 hour. The obtained alloy block was mechanically pulverized into particles with a mean particle size of about 25 μm. The alloy composition was $MmNi_{3.55}Mn_{0.40}Al_{0.30}Co_{0.75}$ (Mm is a mixture of rare earth elements). The obtained alloy powders were immersed in a KOH aqueous solution with a specific gravity of 1.30, which was then stirred for 60 minutes.

Subsequently, a negative electrode paste was prepared by mixing 0.15 parts by weight of carboxymethyl cellulose as thickener, 0.3 parts by weight of carbon black as conductive agent, 0.8 parts by weight of styrene-butadiene copolymer rubber as binder and an appropriate amount of water as dispersion medium with 100 parts by weight of the hydrogen storage alloy powder.

As the negative electrode core material was formed a 0.03 mm thick punched iron metal plated with nickel. The negative electrode paste was applied onto the both surfaces of the negative electrode core material, which was then dried and pressed to form a negative electrode active material layer. This gave a negative electrode comprising the punched metal core material and the negative electrode active material layers carried on the core material. The thickness of the negative electrode was adjusted when pressing the paste-applied core material.

The negative electrode had a width of 35 mm. The negative electrode active material layer was not carried on the plain longitudinal area, which had a height of 2 mm and a thickness of 0.03 mm, of the negative electrode core material. The plain area was folded once to form an end with a height of 1 mm and a thickness of 0.06 mm.

(iii) Separator

As the separator was prepared a hydrophilicity-imparted non-woven fabric comprising polypropylene. The separator was subjected to a conventional sulfonation treatment to impart hydrophilicity. The apparent density of the separator was 0.35 g/cm$^3$ (weight per unit area of the separator plane: 30 g/m$^2$).

(iv) Battery Assembly

The obtained positive and negative electrodes were spirally wound with the separator interposed therebetween to give an electrode group having the occupying percentage of the electrodes and that of the separator shown in the above (b) to (d). The electrode group was formed such that the outermost thereof was the negative electrode. The thick ends formed of the plain area of the positive and negative electrode core materials were respectively exposed at one end of the electrode group and at the other end thereof so that the ends function as spiral positive and negative electrode leads, respectively. The spiral positive and negative electrode leads were respectively connected with current collector plates made of nickel by a conventional resistance welding in order to collect electric current from the whole thick ends which are formed of the longitudinal areas at the lengthwise ends of the positive and negative electrode core materials. The electrode group was housed in a battery case, and each of the current collector plates was connected to a positive electrode terminal or negative electrode terminal using a lead. A given amount of an electrolyte prepared by dissolving 40 g/l of LiOH in a KOH aqueous solution with a specific gravity of 1.30 was injected into the battery case. The opening of the battery case was sealed by crimping the edge of the opening to a sealing plate to give a SC-size sealed battery with a battery capacity of 3 Ah.

[Battery Evaluation]

Discharge Characteristics

The above-obtained batteries A to E were evaluated in terms of initial discharge characteristics.

Each of the batteries was charged at a current value of 3.0 A (1 C) at 20° C. up to 120% of the theoretical capacity; after 1 hour interval, each of them was discharged at a current value of 30 A (10 C) at 20° C. until the battery voltage reached 0.8 V. As a result, large differences were observed in the output characteristics of the batteries A to E. FIG. 1 shows the average discharge voltage (V) of each of the batteries A to E when discharged at 30 A.

As shown in FIG. 1, the batteries with a separator thickness of not greater than 0.08 mm and a $L_p/L$ ratio of over 5 have a discharge voltage of not less than 1.05 V. Meanwhile, the batteries with a $L_p/L$ ratio of less than 5 have a remarkably decreased discharge voltage.

Cycle Life

The batteries A to E were subjected to a conventional cycle life test.

In the charge/discharge cycle, under the condition of $\Delta T/dt=1.5°$ C./30 sec., each of the batteries was charged at a current value of 4 A, and discharged at a current value of 10 A at 20° C. until the battery voltage reached 0.8 V. As a result, large differences were not observed in the cycle life of the batteries A to E.

EXAMPLE 2

Though the battery capacity was set to 3 Ah in EXAMPLE 1, this example examines the capacity improvement of the SC-size sealed battery. With reference to the battery C of EXAMPLE 1 mentioned previously, the relationship between the separator thickness/apparent density and the battery capacity was investigated.

The batteries C1, C2 and C3 were produced in the same manner as the battery C of EXAMPLE 1, except that the separator thickness and the apparent density were changed according to Table 2. The battery C, C2 and C3 represent embodiments of the present invention, and the battery C1 represents a comparative example. Table 2 shows the separator thickness, apparent density, battery capacity, the percentage occupied by the cross section "$S_s$" of the separator in the transverse cross section "S" of the electrode group, and the percentage occupied by the cross section "$S_p$" of the positive electrode in the transverse cross section "S" of the electrode group.

TABLE 2

| Battery | Thickness of separator (mm) | Apparent density of separator (g/cm³) | Battery capacity (Ah) | Percentage of $S_s$ in S (%) | Percentage of $S_p$ in S (%) |
|---|---|---|---|---|---|
| C | 0.08 | 0.35 | 3.00 | 22 | 46 |
| C1 | 0.12 | 0.41 | 2.70 | 33 | 39 |
| C2 | 0.06 | 0.38 | 3.45 | 17 | 49 |
| C3 | 0.041 | 0.40 | 3.65 | 11 | 52 |

[Battery Evaluation]

Battery Capacity

Table 2 indicates that the battery capacity is improved by as much as 28% when the separator has a thickness of 0.06 mm, which is less than the standard thickness (0.12 mm) of a conventional separator. The battery C1 has a battery capacity of only 2.7 Ah, which falls below 3.0 Ah, because it has an percentage occupied by the cross section "$S_s$" of the separator of over 30% and an percentage occupied by the cross section "$S_p$" of the positive electrode of less than 40% in the transverse cross section "S" of the electrode group.

Discharge Characteristics

Figure 2:
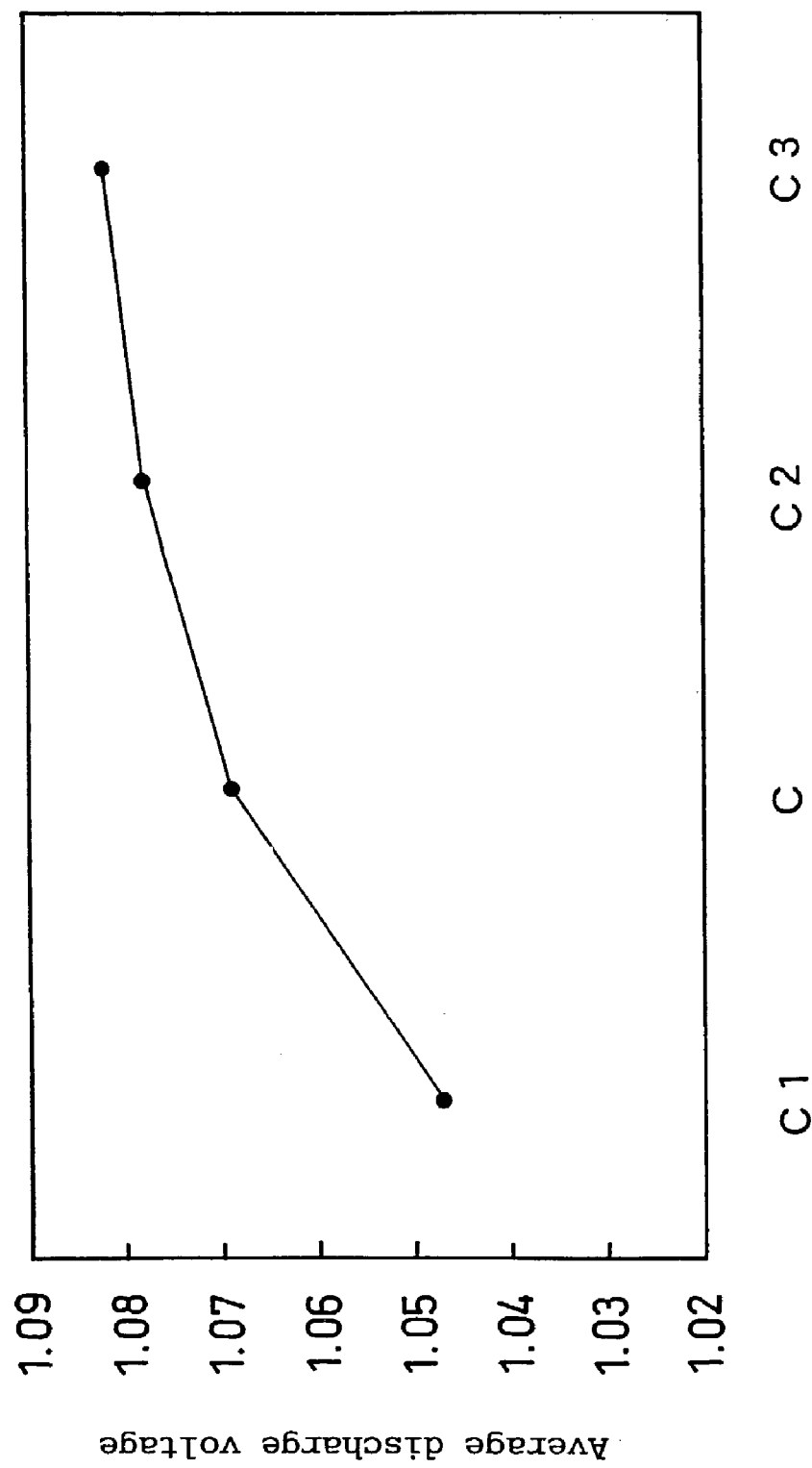
FIG. 2 is a graph showing the average discharge voltage at high rate discharge (when discharged at 30 A) of each of the batteries in accordance with EXAMPLE 2.

The average discharge voltage of the batteries C and C1 to C3 when discharged at a current value of 30 A was examined in the same manner as in EXAMPLE 1. The results are shown in FIG. 2. As is apparent from FIG. 2, the batteries C and C2 to C3, which are embodiments of the present invention, have an average discharge voltage of over 1.05 V when discharged at 10 C, which is a high output. The output characteristics increase with the decrease of the separator thickness and the increase of the battery capacity.

The above results have proved that the batteries C and C2 to C3 are batteries having both high capacity and high output characteristics.

EXAMPLE 3

This example examines the relationship between the apparent density of the separator and the physical property of the separator, and that between the apparent density of the separator and the battery characteristics. Separators having a weight per unit area of the separator plane of 40 g/m² (constant) and an apparent density of 0.3 to 0.45 g/cm³ were produced by changing the thickness thereof.

Figure 3:
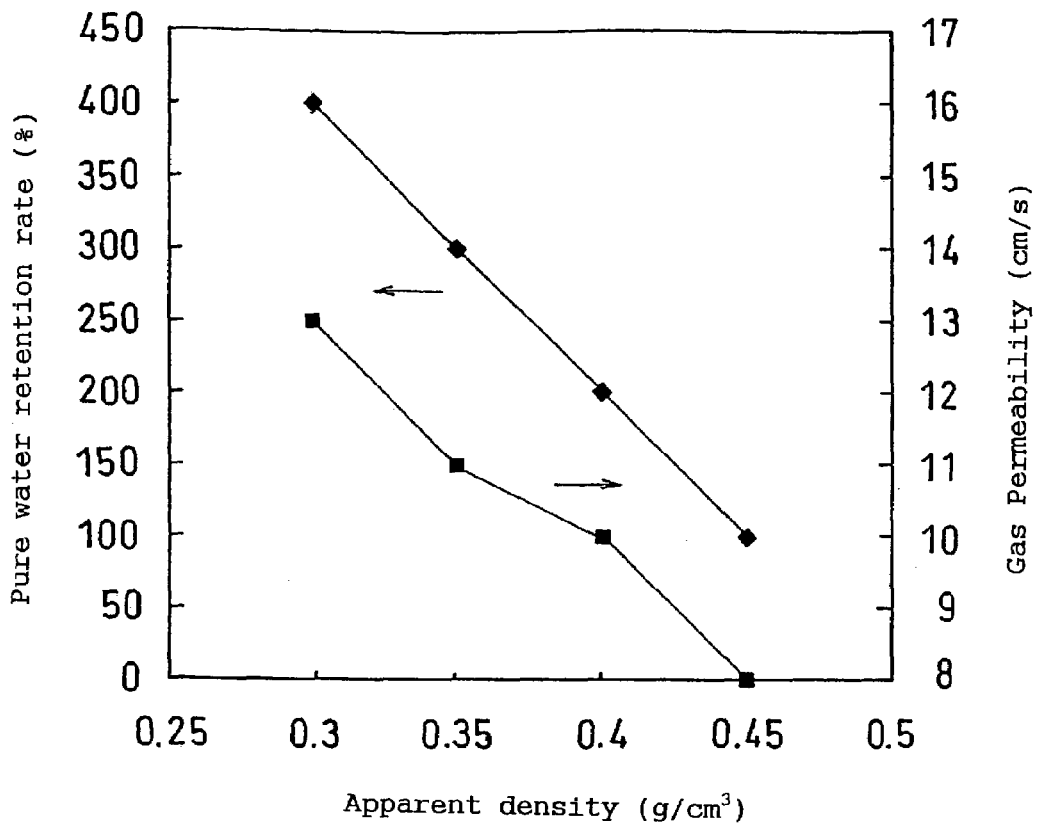
FIG. 3 is a graph showing the relationship between the pure water retention rate or gas permeability and the apparent density, of each of the batteries in accordance with EXAMPLE 3.

FIG. 3 shows the correlation of the pure water retention rate of the separators and the permeability of the gas generated in the battery to the apparent density. FIG. 3 illustrates that the pure water retention rate is over 150% and the permeability is 10 cm/s or higher when the apparent density is 0.4 g/cm³ or less. It is to be noted that the gas permeability was measured according to JIS-L1096: 1999.

[Battery Evaluation]

Figure 4:
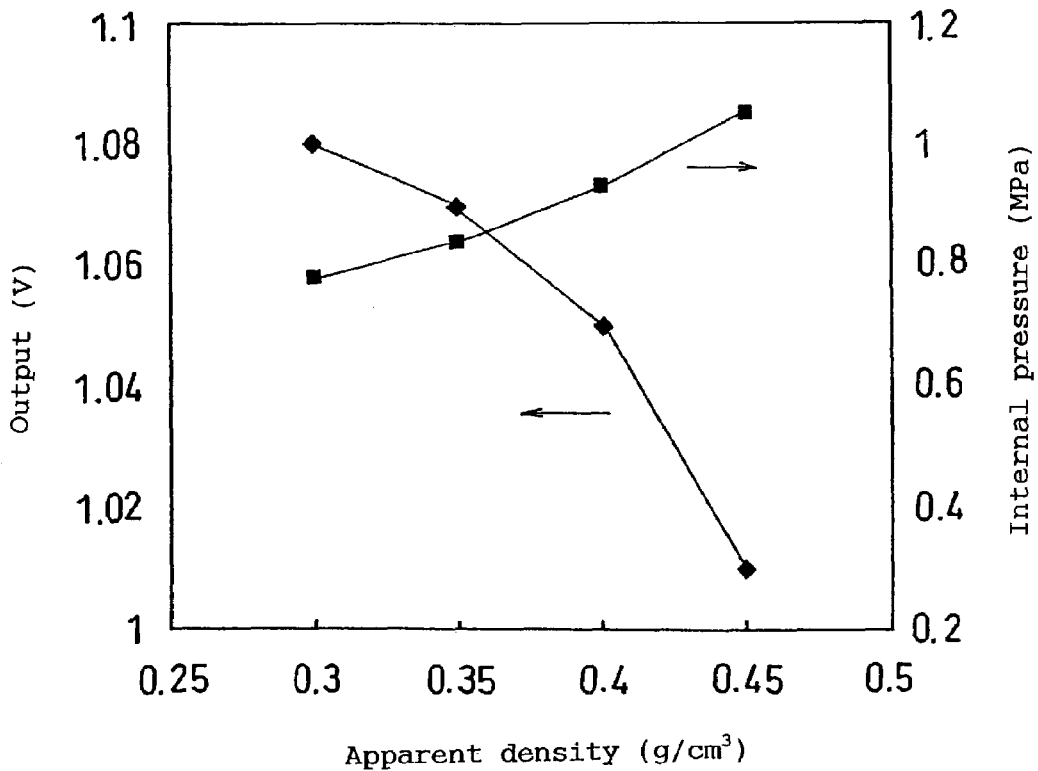
FIG. 4 is a graph showing the relationship between the battery output or internal pressure and the apparent density, of each of the batteries in accordance with EXAMPLE 3.

Batteries similar to the battery C of EXAMPLE 1 were produced using the separators produced above. FIG. 4 shows the correlation of the battery output obtained (average discharge voltage when discharged at 10 C) and the battery internal pressure to the apparent density. The battery internal pressure herein is a maximum pressure within the battery when the battery is charged at a current value of 3 A up to 120% of the battery capacity. FIG. 4 has revealed that excellent characteristics such as an output of not less than 1.05 V and a battery internal pressure of not greater than 1 MPa can be obtained when the apparent density of the separator is not greater than 0.4 g/cm³.

EXAMPLE 4

This example examines the relationship between the type of positive electrode and the incidence of micro short-circuit in the battery.

(i) Positive Electrode Q

The same positive electrode paste as used in EXAMPLE 1 was filled in a foamed nickel sheet (core material) with a thickness of 1 mm and a porosity of 95%, which was then rolled out to give a positive electrode Q with a size of 35 mm×300 mm×0.47 mm. The positive electrode core material was exposed at the surface, in which the positive electrode active material layer and the separator faced with each other, of the positive electrode Q.

(ii) Positive Electrode R

A core material with an apparent thickness of 0.35 mm was prepared by perforating a nickel foil with a thickness of 0.03 mm to form protrusions thereon. The same positive electrode paste as used in EXAMPLE 1 was applied onto this core material to form positive electrode active material layers on the core material to give a positive electrode R with a size of 35 mm×370 mm×0.42 mm. The protrusions were formed alternately on both sides of the nickel foil by perforating the nickel foil using a needle with a diameter of 0.5 mm. The positive electrode core material was not exposed at the surface, in which the positive electrode active material layer and the separator faced with each other, of the positive electrode R.

[Battery Evaluation]

The batteries Q and R were produced in the same manner as the battery C of EXAMPLE 1 except that the positive electrodes Q and R, and the same separator as used for the battery C2 of EXAMPLE 2 with a thickness of 0.06 mm were used. One hundred Battery Qs and 100 Battery Rs were produced; thereafter, the number of batteries which caused micro short-circuits was counted. As a result, micro short-circuits occurred in 38 out of 100 Battery Qs whereas no micro short-circuits occurred in Battery Rs.

This result has revealed that it is extremely effective, in order to prevent micro short-circuits, to use the positive electrode in which the positive electrode core material is not exposed at the electrode surface in which the positive electrode active material layer and the separator face with each other, in the case of using a thin separator.

EXAMPLE 5

This example examines the relationship between the current collecting structure and the output characteristics of the battery and that between the current collecting structure and the impact resistance of the battery.

(i) Battery X

A battery X similar to the battery C of EXAMPLE 1 was produced except that the plain longitudinal area at one lengthwise end of the electrode core material was not folded and used as it was.

(ii) Battery Y

A battery Y similar to the battery C of EXAMPLE 1 was produced except that a Ni ribbon with a height of 1 mm and a thickness of 0.03 mm was welded to the plain longitudinal area at one lengthwise end of the positive electrode core material to form a thick end.

(iii) Battery Z

A battery Z similar to the battery C of EXAMPLE 1 was produced except that powdered Ni was applied onto the both surfaces of the plain longitudinal area at one lengthwise end of the positive electrode core material, which was then sintered to form a sintered Ni layer with a thickness of 0.1 mm and a height of 1 mm on each surface of the plain area, so as to make the plain area thicker. As the powdered Ni, carbonyl nickel powder with a mean particle size of 1 μm was used, and the sintering was performed at 600° C. for 1 hour.

[Battery Evaluation]

As in the case of EXAMPLE 1, the output characteristics of the batteries C and X to Z were evaluated by the average discharge voltage when discharged at a current value of 30 A. As a result, the battery X had an average discharge voltage of 1.05 V. On the other hand, the batteries C, Y and Z respectively had an average discharge voltage of 1.07 V, exhibiting a higher output. Accordingly, the batteries C, Y and Z had an average discharge voltage higher than the battery X. Presumably, this is because the resistance of the welded portion between the current collector plate and the end of the core material decreased.

The changes in internal resistance of the batteries C and X to Z were examined by dropping each of the batteries from the height of 1 m to an iron plate. As a result, the battery X exhibited an internal resistance of not less than 30 mΩ after the 15th drop and the current collector plate came off from the end of the core material. Meanwhile, the batteries C, Y and Z did not show any significant change in internal resistance even after the 100th drop or more.

The above result has proved that, even when a thin core material is used, a battery which excels in output characteristics and impact resistance can be obtained by increasing the thickness of the end of the core material.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A nickel-metal hydride storage battery comprising a spirally wound electrode group,
   said electrode group comprising:
   (a) a positive electrode comprising an active material layer containing nickel hydroxide and a positive electrode core material;
   (b) a negative electrode comprising an active material layer containing a hydrogen storage alloy and a negative electrode core material; and
   (c) a separator, said positive and negative electrodes being wound with said separator interposed therebetween,
   wherein said separator comprises a hydrophilicity-imparted non-woven fabric comprising polyolefin or polyamide and has a thickness of 0.04 to 0 06 mm, said positive electrode has a thickness of 0.1 to 0.4 mm, said negative electrode has a thickness of 0.1 to 0.228 mm, the total thickness of the three layers of said positive electrode, said separator and said negative electrode is 0.24 to 0.708 mm,
   the percentage occupied by the cross section "$S_p$" of said positive electrode in the transverse cross section "S" of said electrode group is not less than 40%,
   the percentage occupied by the cross section "$S_s$" of said separator in the transverse cross section "S" of said electrode group is not greater than 25%,
   the battery further comprising a battery case for containing said electrode group, wherein the length of said positive electrode is not less than 5 times and not more than 10 times the inner perimeter "L" in the transverse cross section of the battery case.

2. The nickel-metal hydride storage battery in accordance with claim 1, wherein said separator has an apparent density of 0.3 to 0.4 g/cm$^3$.

3. The nickel-metal hydride storage battery in accordance with claim 1, wherein said positive electrode core material comprises a metal foil with a thickness of not greater than 0.03 mm, said metal foil is flat or has a three-dimensional structure due to deformation from the major plane of the metal foil, and the positive electrode core material is not exposed at the surface, on which the active material layer containing nickel hydroxide and the separator face with each other, of the positive electrode.

4. The nickel-metal hydride storage battery in accordance with claim 1, wherein each of the positive and negative electrode core materials has a thicker lengthwise end than the other portion thereof, and said thicker ends of the positive and negative electrode core materials are respectively exposed at one end and the other end of said electrode group to serve as spiral positive and negative electrode leads.

* * * * *